United States Patent
Shim et al.

(10) Patent No.: US 11,817,082 B2
(45) Date of Patent: Nov. 14, 2023

(54) ELECTRONIC DEVICE FOR PERFORMING VOICE RECOGNITION USING MICROPHONES SELECTED ON BASIS OF OPERATION STATE, AND OPERATION METHOD OF SAME

(71) Applicant: Samsung Electronics Co., Ltd., Suwon-si (KR)

(72) Inventors: Jaekyu Shim, Suwon-si (KR); Seunghyun Cho, Suwon-si (KR); Sungmin Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 326 days.

(21) Appl. No.: 17/276,342

(22) PCT Filed: May 28, 2019

(86) PCT No.: PCT/KR2019/006386
§ 371 (c)(1),
(2) Date: Mar. 15, 2021

(87) PCT Pub. No.: WO2020/080635
PCT Pub. Date: Apr. 23, 2020

(65) Prior Publication Data
US 2022/0044670 A1    Feb. 10, 2022

(30) Foreign Application Priority Data
Oct. 18, 2018  (KR) .......................... 10-2018-0124225

(51) Int. Cl.
*G10L 15/02*  (2006.01)
*G10L 15/08*  (2006.01)
(Continued)

(52) U.S. Cl.
CPC ............ *G10L 15/02* (2013.01); *G10L 15/083* (2013.01); *G10L 15/22* (2013.01); *H04R 1/1041* (2013.01);
(Continued)

(58) Field of Classification Search
CPC .............. G10L 15/22; G10L 2015/088; G10L 2015/223; G10L 2021/02166; G10L 15/30
See application file for complete search history.

(56) References Cited

U.S. PATENT DOCUMENTS 9,743,204 B1 *   8/2017  Welch .................... H04R 3/005
10,304,475 B1 *  5/2019  Wang ....................... G01S 3/80
(Continued)

FOREIGN PATENT DOCUMENTS

| KR | 10-2016-0001964 A | 1/2016 |
| KR | 10-2017-0087207 A | 7/2017 |
| KR | 10-2017-0140314 A | 12/2017 |

*Primary Examiner* — Mark Villena
(74) *Attorney, Agent, or Firm* — Jefferson IP Law, LLP

(57) ABSTRACT

Various embodiments of the present invention relate to an electronic device for performing voice recognition using microphones selected on the basis of the operation state, and an operation method of same. According to an embodiment, the electronic device includes: one or more microphone arrays which include a plurality of microphones; at least one processor operatively connected to the microphone arrays; and at least one memory electrically connected to the processor, wherein the memory may store instructions for the processor to, at the time of execution; receive wake-up utterances, for calling designated voice services, by using a first group of microphones among the plurality of microphones when operating in a first state; operate in a second state in response to the wake-up utterances; and receive subsequent utterances using a second group of microphones among the plurality of microphones when operating in the second state. Various other embodiments are also possible.

14 Claims, 14 Drawing Sheets

(51) Int. Cl.
*G10L 15/22* (2006.01)
*H04R 1/10* (2006.01)
*H04R 3/00* (2006.01)

(52) U.S. Cl.
CPC ........ H04R 3/005 (2013.01); *G10L 2015/223* (2013.01); *G10L 2015/228* (2013.01)

(56) References Cited

U.S. PATENT DOCUMENTS

| | | |
|---|---|---|
| 10,679,621 B1* | 6/2020 | Sundaram ............... H04W 4/12 |
| 2002/0161586 A1 | 10/2002 | Wang |
| 2009/0190769 A1 | 7/2009 | Wang et al. |
| 2016/0314805 A1 | 10/2016 | Mortazavi et al. |
| 2017/0206900 A1 | 7/2017 | Lee et al. |
| 2017/0330564 A1 | 11/2017 | Daley et al. |
| 2018/0182387 A1* | 6/2018 | Chua ....................... H04R 1/406 |
| 2018/0249246 A1* | 8/2018 | Kjems .................... H04R 3/005 |
| 2018/0366122 A1 | 12/2018 | Lee et al. |
| 2019/0214011 A1* | 7/2019 | Shin .................... G10L 21/0216 |

* cited by examiner

ELECTRONIC DEVICE FOR PERFORMING VOICE RECOGNITION USING MICROPHONES SELECTED ON BASIS OF OPERATION STATE, AND OPERATION METHOD OF SAME

TECHNICAL FIELD

The disclosure relates to a method of providing an intelligent assistance service, and an electronic device for performing the same.

BACKGROUND ART

Recently, an intelligent assistance service capable of providing intuitive interfaces between users and electronic devices is being developed. The intelligent assistance service may perform natural language processing on a user's utterance, so as to infer the intension of the user, and may perform processing so that a control device is controlled based on the inferred intention of the user.

DISCLOSURE OF INVENTION

Technical Problem

Generally, the performance of an intelligent assistance service is associated with an utterance recognition rate. Accordingly, an electronic device may be equipped with a plurality of microphones in order to improve an utterance recognition rate. However, the electronic device may perform a large amount of operations when performing pre-processing on an utterance received via the plurality of microphones, and thus, may consume a large amount of power which is a drawback.

Recently, as a method for overcoming the above-mentioned problem, there is provided a technology that performs pre-processing on an utterance using a sub-processor, and if a keyword is recognized by the sub-processor, wakes up a main processor so as to recognize utterance. The technology may reduce the amount of power consumed. However, the processing capability of the sub-processor is limited and high-level pre-processing on an utterance is impossible. Accordingly, an utterance recognition rate may deteriorate.

Various embodiments described below may provide an electronic device for improving the performance of an assistance service and an operation method thereof.

Solution to Problem

In accordance with an aspect of the disclosure, an electronic device may include: one or more microphone arrays including a plurality of microphones; at least one processor operatively connected to the microphone arrays; and at least one memory electrically connected to the at least one processor, wherein the memory stores instructions which, when executed, enable the at least one processor to: receive a wake-up utterance, which calls a designated voice service, using first group microphones among the plurality of microphones, while operating in a first state; operate in a second state in response to the wake-up utterance; and receive a subsequent utterance using second group microphones among the plurality of microphones, while operating in the second state.

In accordance with an aspect of the disclosure, an operation method of an electronic device may include: while operating in a first state, receiving a wake-up utterance, which calls a designated voice service, using first group microphones among a plurality of microphones, and in response to the wake-up utterance, changing a state of the electronic device to a second state; and while operating in the second state, receiving a subsequent utterance using second group microphones among the plurality of microphones.

In accordance with an aspect of the disclosure, a non-transitory computer-readable recording medium may store a program to implement: activation of a first processor so as to receive a wake-up utterance that calls a designated voice service using first group microphones among a plurality of microphones while operating in a first state; and execution of a second processor to operate in a second state that receives a subsequent utterance using second group microphones among the plurality of microphones in response to the wake-up utterance.

Advantageous Effects of Invention

According to various embodiments, there are provided an electronic device and an operation method therefor, which are capable of improving the performance of a voice recognition service by receiving an utterance via first group microphones among a plurality of microphones while the electronic device operates in a first state (e.g., in a sleep mode), and receiving an utterance via second group microphones among the plurality of microphones while the electronic device operates in a second state (e.g., in a wake-up mode).

According to various embodiments, there are provided an electronic device and an operation method therefor, which stores an utterance received via first microphones until the first state is changed to a second state, and processes the stored utterance after the state is changed to the second state, and thus, omission or delay of processing of a subsequent utterance may be prevented.

BEST MODE FOR CARRYING OUT THE INVENTION

Hereinafter, embodiments of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Figure 1:
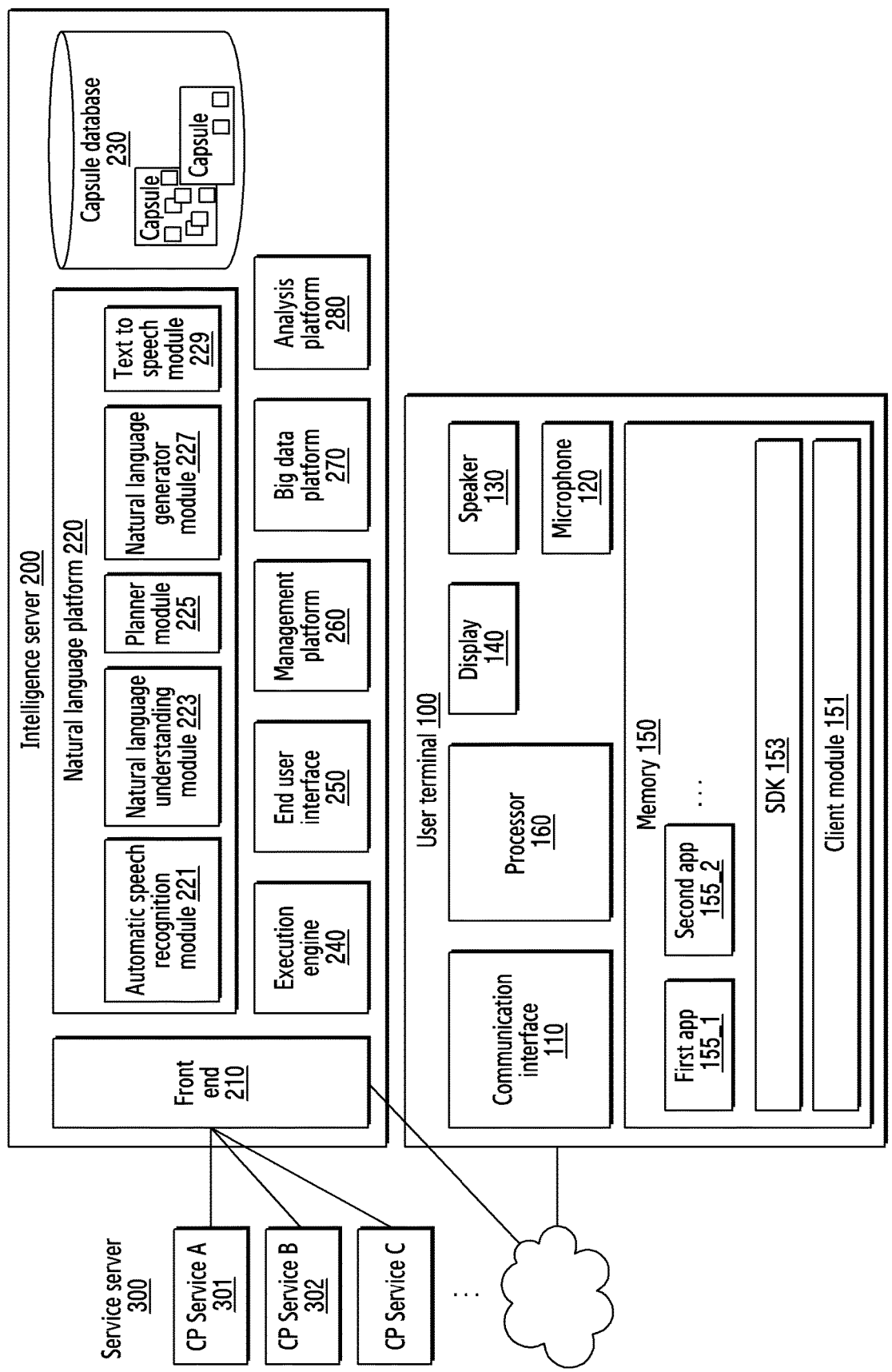
FIG. 1 is a block diagram illustrating an integrated intelligence system according to an embodiment.

FIG. 1 is a block diagram illustrating an integrated intelligence system according to an embodiment.

Referring to FIG. 1, an integrated intelligence system 10 according to an embodiment may include a user equipment (UE) 100, an intelligent server 200, and a service server 300.

The UE 100 according to an embodiment may be a terminal device (or an electronic device) which is connectable to the Internet, for example, a portable phone, a smart phone, a personal digital assistant (PDA), a notebook computer, a TV, white goods, a wearable device, a HMD, or a smart speaker.

According to the illustrated embodiment, the UE 100 may include a communication interface 110, a microphone 120, a speaker 130, a display 140, a memory 150, or a processor 160. The above-mentioned elements may be operatively or electrically connected to each other.

The communication interface 110 according to an embodiment may be configured to perform data transmission or reception by being connected to an external device. The microphone 120 according to an embodiment may receive a sound (e.g., a user utterance), and may convert the sound into an electric signal. The speaker 130 according to an embodiment may output an electric signal as a sound (e.g., voice). The display 140 according to an embodiment may be configured to display an image or video. The display 140 according to an embodiment may display a graphic user interface (GUI) of an executed application (app) (or an application program).

The memory 150 according to an embodiment may store a client module 151, a software development kit (SDK) 153, and a plurality of apps 155. The client module 151 and the SDK 153 may configure a framework (or a solution program) for performing a general-purpose function. In addition, the client module 151 or the SDK 153 may configure a framework for processing a voice input.

The plurality of apps 155 may be a program for performing a designated function. According to an embodiment, the plurality of apps 155 may include a first app 155_1 and a second app 155_3. According to an embodiment, each of the plurality of apps 155 may include a plurality of actions for performing a designated function. For example, the plurality of apps may include an alarm app, a message app, and/or a schedule app. According to an embodiment, the plurality of apps 155 may be executed by the processor 160, and may sequentially execute at least some of the plurality of actions.

The processor 160 according to an embodiment may control overall operations of the UE 100. For example, the processor 160 may be electrically connected to the communication interface 110, the microphone 120, the speaker 130, and the display 140, and may perform a designated operation.

The processor 160 according to an embodiment may execute a program stored in the memory 150, and may perform a designated function. For example, the processor 160 may execute at least one of the client module 151 or the SKD 153, and may perform subsequent operations for processing a voice input. The processor 160 may control actions of the plurality of apps 155 via the SDK 153. The operations which are described as the operations of the client module 151 or the SDK 153 may be operations performed by executing the processor 160.

The client module 151 according to an embodiment may receive a voice input. For example, the client module 151 may receive a voice signal corresponding to a user utterance detected via the microphone 120. The client module 151 may transmit the received voice input to the intelligent server 200. The client module 151 may transmit state information of the UE 100 to the intelligent server 200, together with the received voice input. The state information may be, for example, execution state information of an app.

The client module 151 according to an embodiment may receive a result corresponding to the received voice input. For example, if the intelligent server 200 is capable of obtaining a result corresponding to the received voice input, the client module 151 may receive the result corresponding to the received voice input. The client module 151 may display the received result on the display 140.

The client module 151 according to an embodiment may receive a plan corresponding to the received voice input. The client module 151 may display results, obtained by performing a plurality of actions of an app according to the plan, on the display 140. For example, the client module 151 may sequentially display results of execution of the plurality of actions on the display. As another example, the UE 100 may display, on the display, only a part of the results of execution of the plurality of actions (e.g., the result of a last action).

According to an embodiment, the client module 151 may receive, from the intelligent server 200, a request for information needed for obtaining a result corresponding to the voice input. According to an embodiment, the client module 151 may transmit the needed information to the intelligent server 200 in response to the request.

The client module 151 according to an embodiment may transmit information associated with results, obtained by performing the plurality of actions according the plan, to the intelligent server 200. The intelligent server 200 may identify that the received voice input is correctly processed, based on the result information.

The client module 151 according to an embodiment may include a voice recognition module. According to an embodiment, the client module 151 may recognize a voice input for performing a limited function, via the voice recognition module. For example, the client module 151 may execute an intelligent app for processing a voice input for performing organic operations, via a designated input (e.g., "wake up!").

The intelligent server 200 according to an embodiment may receive information associated with a user voice input from the UE 100 over a communication network. According to an embodiment, the intelligent server 200 may change data related to the received voice input into text data. According to an embodiment, the intelligent server 200 may produce a plan for performing a task corresponding to the user voice input, based on the text data.

According to an embodiment, the plan may be produced by an artificial intelligent (AI) system. The AI system may be a rule-based system, or may be a neural network-based system (e.g., a feedforward neural network (FNN) or recurrent neural network (RNN)). Alternatively, the AI system may be a combination of the above-mentioned systems, or another AI system. According to an embodiment, the plan may be selected from a set of predetermined plans, or may be produced in real time in response to a user request. For example, the AI system may select at least one plan among a plurality of predetermined plans.

The intelligent server 200 according to an embodiment may transmit a result obtained according to the produced plan to the UE 100, or may transmit the produced plan to the UE 100. According to an embodiment, the UE 100 may display the result obtained according to the plan on the display. According to an embodiment, the UE 100 may display a result, obtained by performing an operation according to the plan, on the display.

The intelligent server 200 according to an embodiment may include a front end 210, a natural language platform 220, a capsule DB 230, an execution engine 240, an end user interface 250, a management platform 260, a big data platform 270, or an analytic platform 280.

The front end 210 according to an embodiment may receive a voice input received from the UE 100. The front end 210 may transmit a response corresponding to the voice input.

According to an embodiment, the natural language platform 220 may include an automatic speech recognition (ASR) module 221, a natural language understanding (NLU) module 223, a planner module 225, a natural language generator (NLG) module 227, or a text to speech (TTS) module 229.

The ASR module 221 may convert a voice input received from the UE 100 into text data. The NLU module 223 according to an embodiment may recognize the intention of a user using the text data of the voice input. For example, the NLU module 223 may recognize the intention of a user by performing syntactic analysis (syntactic analyze) or semantic analysis (semantic analyze). The NLU module 223 according to an embodiment may recognize the meaning of a word extracted from the voice input using the linguistic traits (e.g., syntactic elements) of a morpheme or a phrase, and may determine the intention of a user by matching the recognized meaning of the word to the intention.

The planer module 225 according to an embodiment may produce a plan using the intention determined by the NLU module 223 and a parameter. According to an embodiment, the planer module 225 may determine, based on the determined intention, a plurality of domains needed for performing a task. The planner module 225 may determine, based on the intention, a plurality of actions included in each of the plurality of domains. According to an embodiment, the planer module 225 may determine a parameter needed for performing the plurality of determined actions, or may determine a result value output via execution of the plurality of actions. The parameter and the result value may be defined by a concept provided in a predetermined format (or class). Accordingly, the plan may include the plurality of actions determined by a user intention and a plurality of concepts. The planner module 225 may determine the relationship between the plurality of actions and the plurality of concepts, in stages (or hierarchically). For example, based on the plurality of concepts, the planer module 225 may determine the order of execution of the plurality of actions determined based on the user intention. In other words, the planner module 225 may determine the order of execution of the plurality of actions, based on parameters needed for executing the plurality of actions and results output by execution of the plurality of actions. Accordingly, the planner module 225 may produce a plan including relationship information (e.g., ontology) between the plurality of actions and the plurality of concepts. The planner module 225 may produce a plan using information stored in the capsule database 230 that stores a set of relationships between concepts and actions.

The NLG module 227 may change designated information into a text form. The information changed into a text form may be in the form of a natural language utterance. The TTS module 229 may change information in the text form into information in a voice form.

According to an embodiment, some or all of the functions of the natural language platform 220 may also be implemented in the UE 100.

The capsule DB 230 may store information associated with the relationship between a plurality of actions and a plurality of concepts which correspond to a plurality of domains. A capsule according to an embodiment may include a plurality of action objects (or action information) and a plurality of concept objects (or concept information) included in a plan. According to an embodiment, the capsule database 230 may store a plurality of capsules in the form of a concept action network (CAN). According to an embodiment, a plurality of capsules may be stored in a function registry included in the capsule DB 230.

The capsule DB 230 may include a strategy registry that stores strategy information needed for determining a plan corresponding to a voice input. The strategy information may include criterion information for determining a single plan when a plurality of plans corresponding to a voice input are present. According to an embodiment, the capsule DB 230 may include a follow up registry that stores information associated with a subsequent action, in order to suggest a subsequent action to a user under a designated situation. The subsequent action may include, for example, a subsequent utterance. According to an embodiment, the capsule DB 230 may include a layout registry that stores layout information of information output via the UE 100. According to an embodiment, the capsule database 230 may include a vocabulary registry that stores vocabulary information included in capsule information. According to an embodiment, the capsule DB 230 may include a dialog registry that stores dialog information (or interaction information) associated with a user. The capsule DB 230 may update an object stored via a developer tool. The developer tool, for example, may include a function editor for updating an action object or a concept object. The developer tool may include a vocabulary editor for updating a vocabulary. The developer tool may include a strategy editor that produces and registers a strategy for determining a plan. The developer tool may include a dialog editor for producing a dialog with a user. The developer tool may include a follow up editor that is capable of editing a subsequent utterance that activates a subsequent goal and provides a hint. The subsequent goal may be determined based on a currently set goal, a user preference, or an environmental condition. According to an embodiment, the capsule DB 230 may also be implemented in the UE 100.

The execution engine 240 according to an embodiment may obtain a result using the produced plan. The end user interface 250 may transmit the obtained result to the UE 100. Accordingly, the UE 100 may receive the result, and may provide the received result to a user. A management platform 260 according to an embodiment may manage information used in the intelligent server 200. The big data platform 270 according to an embodiment may collect data associated with a user. The analytic platform 280 according to an embodiment may manage a quality of service (QoS) of the intelligent server 200. For example, the analytic platform 280 may manage the elements and a processing speed (or efficiency) of the intelligent server 200.

The service server 300 according to an embodiment may provide a designated service (e.g., ordering food or booking a hotel) to the UE 100. According to an embodiment, the service server 300 may be a server that is operated by a third party. The service server 300 according to an embodiment may provide, to the intelligent server 200, information for producing a plan corresponding to a received voice input. The provided information may be stored in the capsule database 230. In addition, the service server 300 may provide result information obtained according to the plan to the intelligent server 200.

In the above-described integrated intelligence system 10, the UE 100 may provide various intelligent services to a user in response to user inputs. A user input may include, for example, an input via a physical button, a touch input, or a voice input.

According to an embodiment, the UE 100 may provide a voice recognition service via an intelligent app (or a voice recognition app) stored inside. In this instance, for example, the UE 100 may recognize a user utterance or voice input received via the microphone, and may provide a service corresponding to the recognized voice input to a user.

According to an embodiment, the UE 100 may perform a designated action solely or together with the intelligent server and/or service server, based on the received voice input. For example, the UE 100 may execute an app corresponding to the received voice input, and may perform a designated action via the executed app.

According to an embodiment, if the UE 100 provides a service together with the intelligent server 200 and/or service server, the UE 100 may detect a user utterance using the microphone 120, and may produce a signal (or voice data) corresponding to the detected user utterance. The UE may transmit the voice data to the intelligent server 200 using the communication interface 110.

In response to the voice input received from the UE 100, the intelligent server 200 according to an embodiment may produce a plan for executing a task corresponding to the voice input or a result obtained by performing an action according to the plan. The plan may include, for example, a plurality of actions for performing the task corresponding to the user voice input, and a plurality of concepts related to the plurality of actions. The concepts may define parameters input to execution of the plurality of actions or result values output by execution of the plurality of actions. The plan may include the relation information between the plurality of actions and the plurality of concepts.

The UE 100 according to an embodiment may receive the response using the communication interface 110. The UE 100 may output a voice signal, produced inside the UE 100, to the outside via the speaker 130, or may output an image, produced inside the UE 100, to the outside via the display 140.

Figure 2:
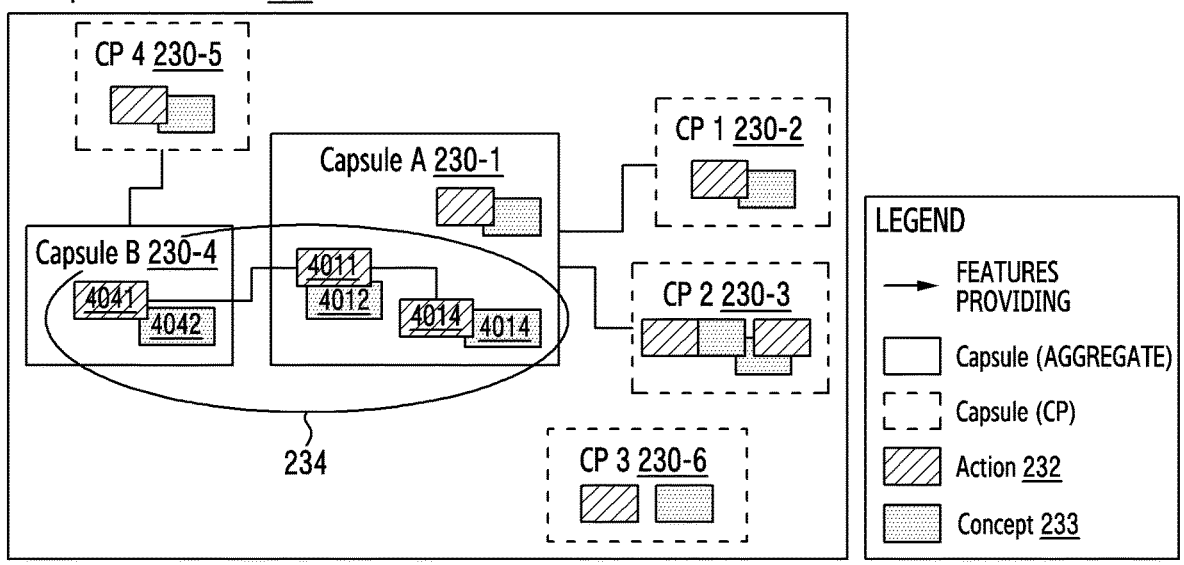
FIG. 2 is a diagram illustrating a form in which relationship information between a concept and an action is stored in a database according to an embodiment.

FIG. 2 is a diagram illustrating a form in which relationship information between a concept and an action is stored in a database according to various embodiments.

A capsule DB (e.g., the capsule DB 230) of the intelligent server 200 may store a capsule in the form of the concept action network (CAN) 231. The capsule DB may store an action for processing a task corresponding to a user voice input and a parameter needed for the action, in the form of the concept action network (CAN) 231.

The capsule DB may store a plurality of capsules (capsule A 230-1 and capsule B 230-4) that respectively correspond to a plurality of domains (e.g., applications). According to an embodiment, a single capsule (e.g., capsule (A) 230-1) may correspond to a single domain (e.g., location (geo) or an application). In addition, at least one service provider (e.g., CP 1 230-2 or CP 2 230-3) for performing a function of a domain related to a single capsule may correspond to the single capsule. According to an embodiment, a single capsule may include at least one action 232 for performing a designated function and at least one concept 233.

The natural language platform 220 may produce a plan for performing the task corresponding to the received voice input, using a capsule stored in the capsule DB. For example, the planer module 225 of a natural language platform may produce a plan using a capsule stored in the capsule database. For example, a plan 234 may be produced using actions 4011 and 4013 and concepts 4012 and 4014 of the capsule A 230-1, and an action 4041 and a concept 4042 of capsule B 404.

Figure 3:
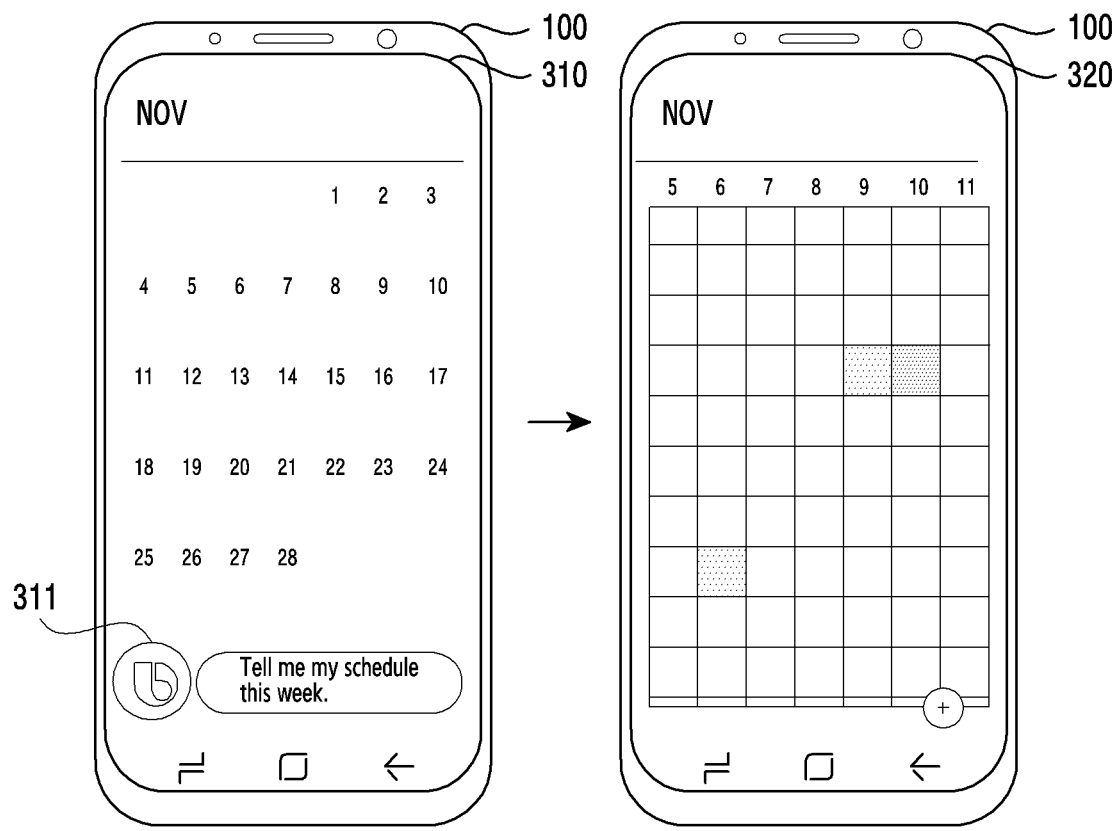
FIG. 3 is a diagram illustrating a user equipment that displays a screen which processes a received voice input via an intelligent application, according to an embodiment.

FIG. 3 is a diagram illustrating a screen for processing a received voice input via an intelligent app in a user equipment according to various embodiments.

The UE 100 may execute an intelligent app in order to process a user input using the intelligent server 200.

According to an embodiment, if the UE 100 recognizes a designated voice input (e.g., wake up!) or receives an input via a hardware key (e.g., a dedicated hardware key), the UE 100 may execute an intelligent app for processing the voice input via a screen 310. For example, the UE 100 may execute an intelligent app in the state of executing a schedule app. According to an embodiment, the UE 100 may display an object 311 (e.g., an icon) corresponding to an intelligent app on the display 140. According to an embodiment, the UE 100 may receive a voice input by a user utterance. For example, the UE 100 may receive a voice input, "Tell me my schedule this week." According to an embodiment, the UE 100 may display, on the display, a user interface (UI) (e.g., an input window) of an intelligent app which displays the text data of the received voice input.

According to an embodiment, the UE 100 may display a result corresponding to the received voice input on the display as shown in a screen 320. For example, the UE 100 may receive a plan corresponding to the received user input, and may display 'schedule this week' on the display according to the plan.

Figure 4:
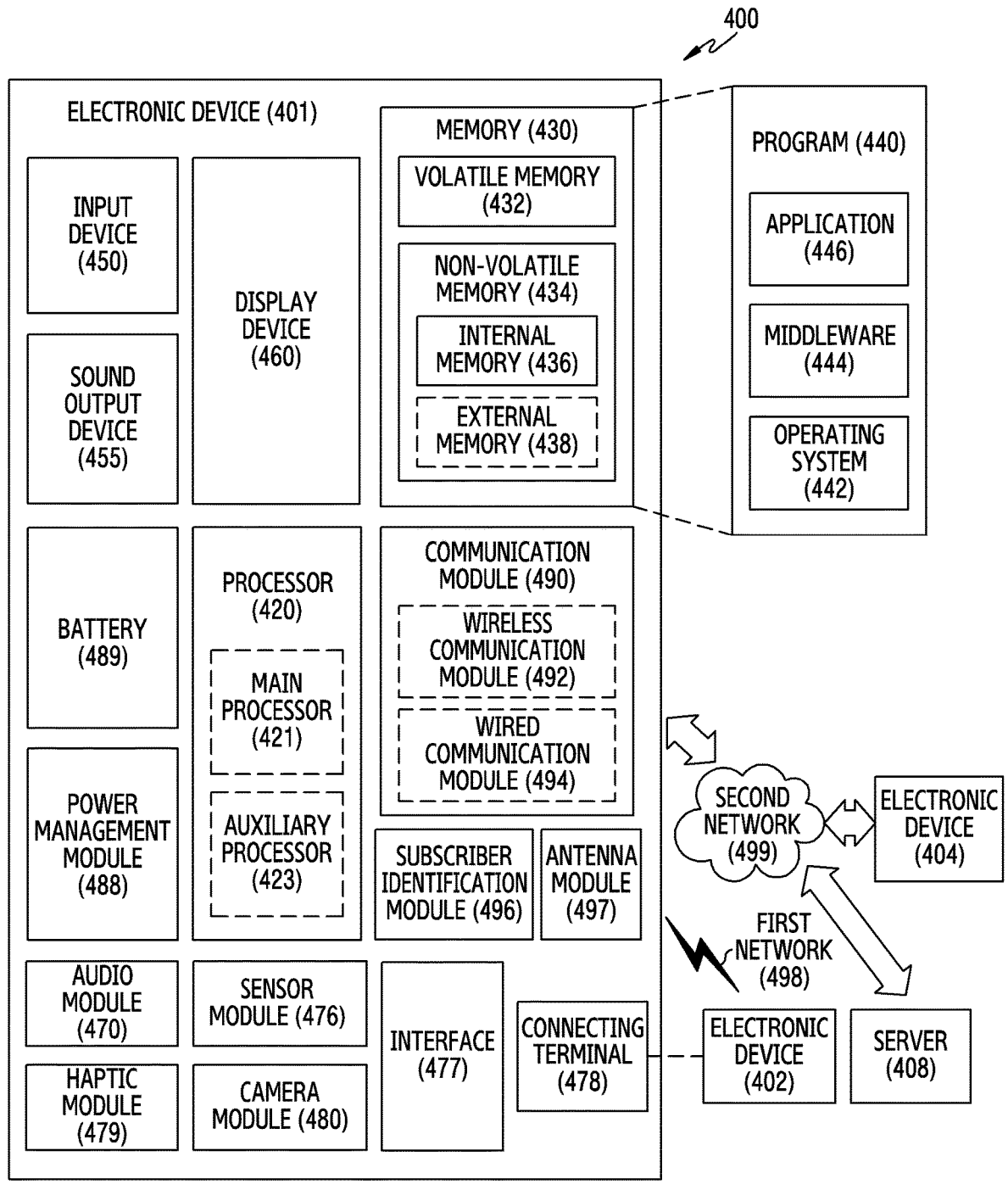
FIG. 4 is a block diagram of an electronic device in a network environment which performs voice recognition using a microphone selected based on an operation state according to various embodiments.

FIG. 4 is a block diagram of an electronic device 401 in a network environment 400 which performs voice recognition using a microphone selected based on an operation state according to various embodiments. The electronic device of FIG. 4 may be the UE 100 of FIG. 1.

FIG. 4 is a block diagram illustrating an electronic device 401 in a network environment 400 according to various embodiments. Referring to FIG. 4, the electronic device 401 in the network environment 400 may communicate with an electronic device 402 via a first network 498 (e.g., a short-range wireless communication network), or an electronic device 404 or a server 408 via a second network 499 (e.g., a long-range wireless communication network). According to an embodiment, the electronic device 401 may communicate with the electronic device 404 via the server 408. According to an embodiment, the electronic device 401 may include a processor 420, memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) 496, or an antenna module 497. In some embodiments, at least one (e.g., the display device 460 or the camera module 480) of the components may be omitted from the electronic device 401, or one or more other components may be added in the electronic device 401. In some embodiments, some of the components may be implemented as single integrated circuitry. For example, the sensor module 476 (e.g., a fingerprint sensor, an iris sensor, or an illuminance sensor) may be implemented as embedded in the display device 460 (e.g., a display).

The processor 420 may execute, for example, software (e.g., a program 440) to control at least one other component (e.g., a hardware or software component) of the electronic device 401 coupled with the processor 420, and may perform various data processing or computation. According to one embodiment, as at least part of the data processing or computation, the processor 420 may load a command or data received from another component (e.g., the sensor module 476 or the communication module 490) in volatile memory 432, process the command or the data stored in the volatile memory 432, and store resulting data in non-volatile memory 434. According to an embodiment, the processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or to be specific to a specified function. The auxiliary processor 423 may be implemented as separate from, or as part of the main processor 421.

The auxiliary processor 423 may control at least some of functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to an embodiment, the auxiliary processor 423 (e.g., an image signal processor or a communication processor) may be implemented as part of another component (e.g., the camera module 480 or the communication module 490) functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input device 450 may receive a command or data to be used by another component (e.g., the processor 420) of the electronic device 401, from the outside (e.g., a user) of the electronic device 401. The input device 450 may include, for example, a microphone, a mouse, a keyboard, or a digital pen (e.g., a stylus pen).

The sound output device 455 may output sound signals to the outside of the electronic device 401. The sound output device 455 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. According to an embodiment, the display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. According to an embodiment, the audio module 470 may obtain the sound via the input device 450, or output the sound via the sound output device 455 or a headphone of an external electronic device (e.g., an electronic device 402) directly (e.g., wiredly) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. According to an embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device (e.g., the electronic device 402) directly (e.g., wiredly) or wirelessly. According to an embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device (e.g., the electronic device 402). According to an embodiment, the connecting terminal 478 may include, for example, a HDMI connector, a USB connector, a SD card connector, or an audio connector (e.g., a headphone connector).

The haptic module 479 may convert an electrical signal into a mechanical stimulus (e.g., a vibration or a movement) or electrical stimulus which may be recognized by a user via his tactile sensation or kinesthetic sensation. According to an embodiment, the haptic module 479 may include, for example, a motor, a piezoelectric element, or an electric stimulator.

The camera module 480 may capture a still image or moving images. According to an embodiment, the camera module 480 may include one or more lenses, image sensors, image signal processors, or flashes.

The power management module 488 may manage power supplied to the electronic device 401. According to one embodiment, the power management module 488 may be implemented as at least part of, for example, a power management integrated circuit (PMIC).

The battery 489 may supply power to at least one component of the electronic device 401. According to an embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the application processor (AP)) and supports a direct (e.g., wired) communication or a wireless communication. According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth™, wireless-fidelity (Wi-Fi) direct, or infrared data association (IrDA)) or the second network 499 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 401. According to an embodiment, the antenna module 497 may include an antenna including a radiating element composed of a conductive material or a conductive pattern formed in or on a substrate (e.g., PCB). According to an embodiment, the antenna module 497 may include a plurality of antennas. In such a case, at least one antenna appropriate for a communication scheme used in the communication network, such as the first network 498 or the second network 499, may be selected, for example, by the communication module 490 (e.g., the wireless communication module 492) from the plurality of antennas. The signal or the power may then be transmitted or received between the communication module 490 and the external electronic device via the selected at least one antenna. According to an embodiment, another component (e.g., a radio frequency integrated circuit (RFIC)) other than the radiating element may be additionally formed as part of the antenna module 497.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 401 and the external electronic device 404 via the server 408 coupled with the second network 499. Each of the electronic devices 402 and 404 may be a device of a same type as, or a different type, from the electronic device 401. According to an embodiment, all or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 440) including one or more instructions that are stored in a storage medium (e.g., internal memory 436 or external memory 438) that is readable by a machine (e.g., the electronic device 401). For example, a processor (e.g., the processor 420) of the machine (e.g., the electronic device 401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 5A:
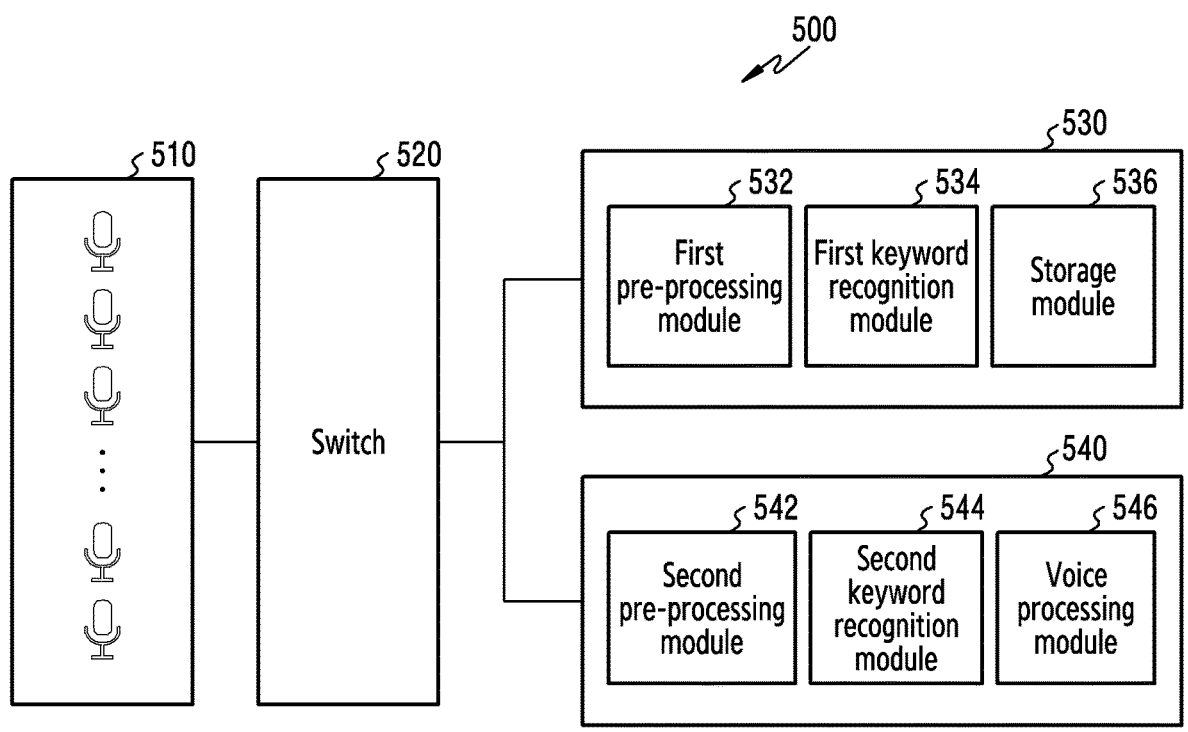
FIG. 5A is a diagram illustrating the configuration of an electronic device according to various embodiments of the disclosure.
Figure 5B:
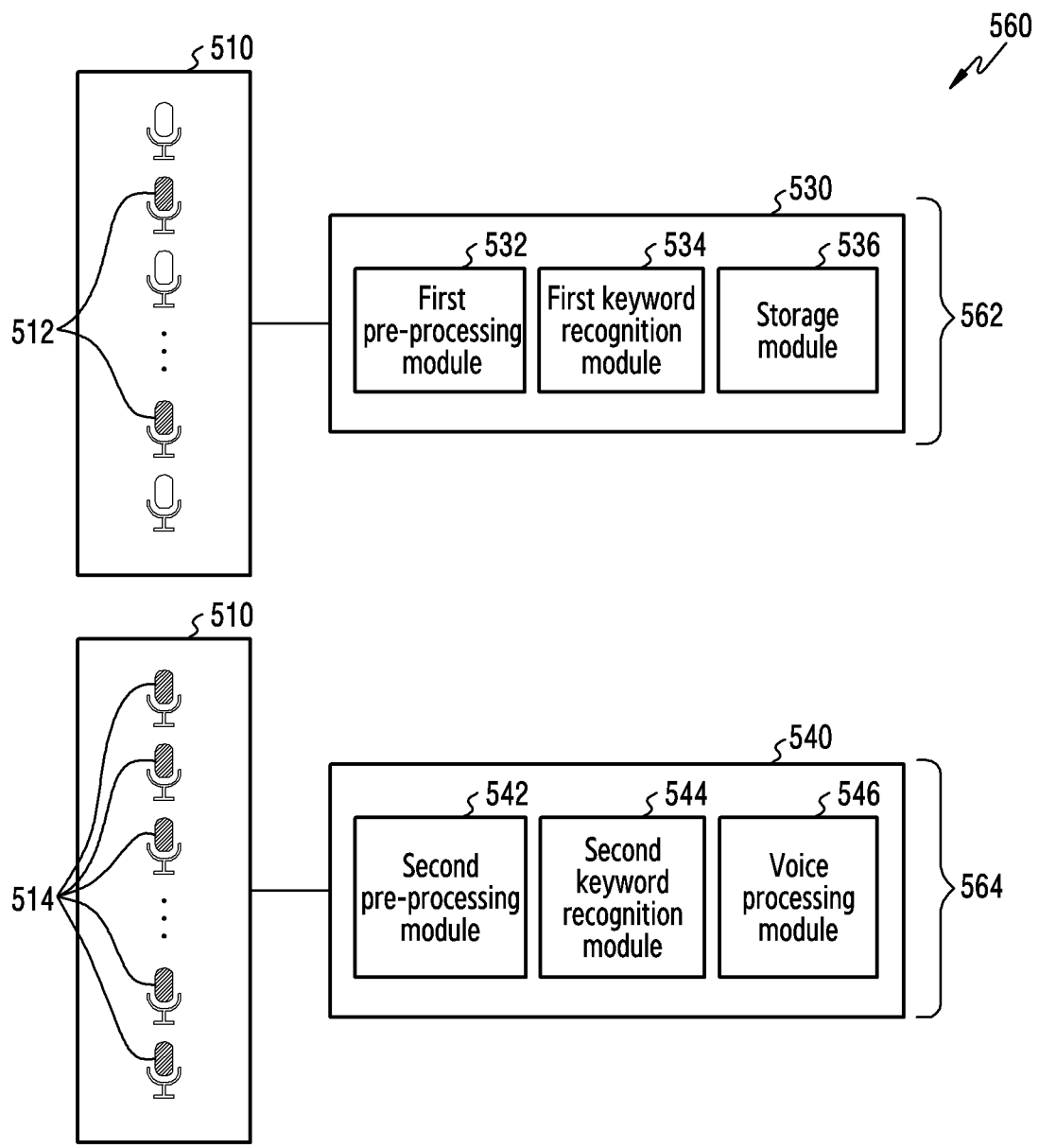
FIG. 5B is a diagram illustrating an operation method of an electronic device according to various embodiments.
Figure 5C:
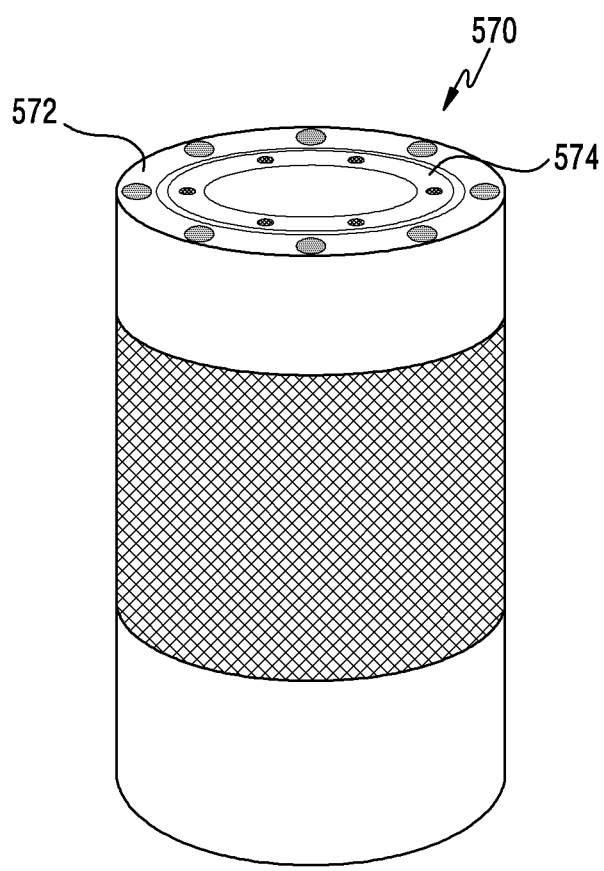
FIG. 5C is a diagram illustrating a microphone array according to various embodiments.
Figure 6:
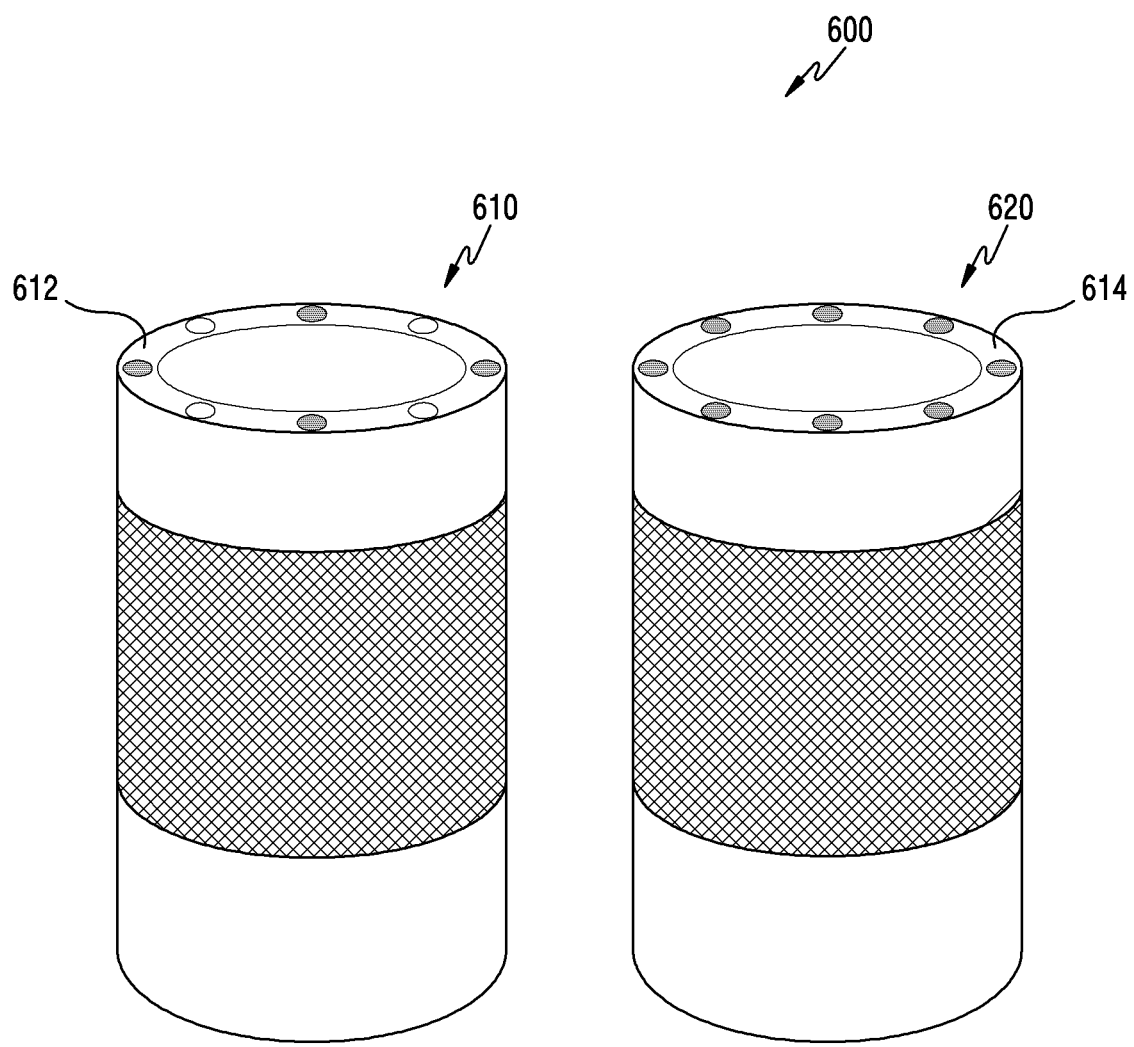
FIG. 6 is a diagram illustrating a microphone array according to various embodiments.

FIG. 5A is a diagram 500 illustrating the configuration of an electronic device according to various embodiments of the disclosure. FIG. 5B is a diagram 560 illustrating an operation method of an electronic device according to various embodiments, and FIGS. 5C and 6 are diagrams 570 and 600 illustrating examples of a microphone array according to various embodiments. The electronic device of FIG. 5A may be the electronic device 401 of FIG. 4.

Referring to FIG. 5A, according to various embodiments, the electronic device may include at least one microphone array (mic array) 510 including a plurality of microphones, at least one switch 520, a first processor 530, and a second processor 540. The first processor 530 and the second processor 540 may be logically or physically separate from each other, and may operate independently or complementarily. According to an embodiment, the first processor 530 may be a low-power processor that consumes a smaller amount of current than the second processor 540. The first processor 530 may include a sub-processor 423 of FIG. 4, and the second processor 540 may include a main processor 421 of FIG. 4.

The mic array 510 may be disposed on top of the electronic device. For example, the mic array 510 may be disposed on a virtual circle that has a predetermined diameter based on the center of the top of the electronic device. For example, if the mic array 510 includes 8 microphones, each microphone may be disposed to be spaced a predetermined angle (e.g., 45°) apart from each other. However, this is merely an example, and the embodiment of the disclosure is not limited thereto. For example, the mic array 510 may be disposed in a lateral side or the bottom of the electronic device. In addition, the number of microphones included in the mic array 510 may be greater or fewer than 8.

According to an embodiment, the mic array 510 may obtain a voice utterance from a user. A voice utterance may include a wake-up utterance that directs activation or calling of an intelligent assistance service, and/or a control utterance that directs operation (e.g., power control or volume control) of a hardware/software configuration included in a control device. The wake-up utterance may be a predetermined keyword (e.g., wake-up keyword) such as "hi," "hello," "ABC," or the like. For example, ABC may be a name assigned to the electronic device (or the voice recognition agent (or artificial intelligence (AI)) of the electronic device), such as Galaxy or the like. In addition, a control utterance may be obtained in the state in which an intelligent assistance service is activated or called by a wake-up utterance. However, this is merely an example, and the embodiment of the disclosure is not limited thereto. For example, a voice utterance including a wake-up utterance and a control utterance may be received via the mic array 510.

A switch 520 may control an output associated with the utterance received via the mic array 510. For example, the switch 520 may control an output associated with first group microphones among a plurality of microphones, or may control an output associated with second group microphones among the plurality of microphones. The first group microphones may be some of the plurality of microphones, and the second group microphones may include a larger number of microphones than the first group microphones. For example, as illustrated in FIG. 5C, at least some microphones included in a first mic array 572 may be the first group microphones, and at least some of the second mic array 574 may be the second group microphones. As another example, the microphones included in the first mic array 572 may be the first group microphones, and at least some of the first mic array 572 and at least some of the second mic array 574 may be the second group microphones.

According to an embodiment, if the electronic device operates in a first state, the switch 520 may provide an utterance, received via first group microphones (e.g., a part of the mic array 510), to the first processor 530. The first state may include a sleep mode (e.g., a low-power mode). If the electronic device operates in the first state, the first processor 530 operates in an activated state, and the second processor 540 may maintain a deactivated state. For example, if the electronic device operates in the first state, the switch 520 may provide, to the first processor 530, an utterance, received via some microphones (e.g., first group microphones 612) disposed in the front and rear directions and the right and left directions based on the location of the electronic device, as shown in diagram 610 of FIG. 6. According to another embodiment, if the electronic device operates in a second state, the switch 520 may provide, to the second processor 540, an utterance, received via second group microphones (e.g., all microphones), the number of which is greater than the number of the first group microphones. The second state may include a wake-up mode (e.g., a normal mode, a high-performance mode, or a high-power mode). If the electronic device operates in the second state, the first processor 530 may maintain a deactivated state, and the second processor 540 may operate in an activated state. However, this is merely an example, and the embodiment of the disclosure is not limited thereto. For example, if the electronic device operates in the second state, both the first processor and the second processor may operate in the activated state. For example, if the electronic device operates in the second state, the switch 520 may provide, to the second processor 540, an utterance, received via all microphones (e.g., second group microphones 614) included in the mic array 510 as shown in diagram 620 of FIG. 6. According to various embodiments, the switch may be implemented as a multiplexer (MUX).

Although the embodiment illustrates a configuration of controlling an output associated with an utterance, received via the mic array 510, using the switch 520, this is merely an example, and the disclosure is not limited thereto. For example, an output associated with an utterance received via the mic array 510 may be controlled, without using the switch 520. For example, the first group microphones may be directly connected to the first processor 530, and the second group microphones may be directly connected to the second processor 540.

The first processor 530 may perform an operation related to the first state of the electronic device. As described above, the first state may include a sleep mode (e.g., a low-power mode). According to an embodiment, the first processor 530 may process utterance data corresponding to an utterance received via the first group microphones 512. Processing the utterance data may include extracting a predetermined keyword from the utterance.

According to various embodiments, the first processor 530 may include a first pre-processing module 532, a first keyword recognition module 534, and a storage module 536.

According to an embodiment, as illustrated in diagram 562 of FIG. 5B, if an utterance is received via the first group microphones 512 (e.g., shaded microphones) of the mic array 510, the first processor 530 may process utterance data corresponding to the utterance via the first pre-processing module 532. For example, the first pre-processing module 532 may process the utterance data using a beamforming technology and a noise cancelling technology.

According to an embodiment, if the utterance data is processed, the first processor 530 may extract a predetermined keyword from the processed utterance data using the first keyword recognition module 534. A keyword may be extracted using various publicly known technologies. For example, the first keyword recognition module 534 may produce text data using the received utterance, and may extract a predetermined keyword from the produced text data.

According to an embodiment, if a predetermined keyword is extracted from the utterance received via the first group microphones, the first processor 530 may request verification of the extracted keyword from the second processor 540. The keyword verification request may include a command that directs wake-up of the second processor 540. For example, in response to extraction of the predetermined keyword from the utterance received via the first group microphones 512, the first processor 530 may provide the received utterance to the second processor 540.

According to an embodiment, while the second processor 540 is performing the keyword verification, the first processor 530 may store a subsequent utterance, received via the first group microphones 512, in the storage module 536. The subsequent utterance may include a control utterance that directs operation of a hardware/software configuration (e.g., power control or volume control) included in at least one control device. Although not illustrated, the control device may include at least one of a smartphone, a computer (e.g., a personal computer, a notebook, or the like), a TV, a lighting device, a refrigerator, an air conditioner, a temperature controller, a crime prevention device, a gas valve control device, and a door lock device.

According to an embodiment, based on a keyword verification result received from the second processor 540, the first processor 530 may determine whether to enter a sleep mode. For example, as a part of a response to the keyword verification request, the first processor 530 may enter the sleep mode in response to reception of information indicating that a keyword is included in the utterance received via the first group microphones 512. For example, if a subsequent utterance stored in the storage module 536 is present, the first processor 530 may provide the subsequent utterance to the second processor 540 before entering the sleep mode. The stored subsequent utterance may be provided to the second processor 540 according to a first input first output (FIFO) control scheme, however, this is merely an example, and the disclosure is not limited thereto. As another example, as a part of a response to the keyword verification request, the first processor 530 may maintain a wake-up mode in response to reception of information indicating that a keyword is not included in the utterance received via the first group microphones 512.

The second processor 540 may perform an operation related to the second state of the electronic device. As described above, the second state may include a wake-up mode (e.g., a normal mode, a high-performance mode, or a high-power mode). According to an embodiment, as illustrated in diagram 564 of FIG. 5B, the second processor 540 may process an utterance received via the second group microphones 514 (e.g., shaded microphones) of the mic array 510. Utterance processing may be understanding of natural language associated with utterance data corresponding to the received utterance. The understanding of natural language may be information associated with a domain, intent, and/or slot obtained via utterance data analysis.

According to various embodiments, the second processor 540 may include a second pre-processing module 542, a second keyword recognition module 544, and a voice processing module 546. According to an embodiment, the second pre-processing module 542 may have a pre-processing capability greater than that of the first pre-processing module 532. For example, the second pre-processing module 542 may process utterance data using an echo cancelling technology, in addition to a beamforming technology and a noise cancelling technology. In addition, the second keyword recognition module 544 may have a recognition capability greater than that of the first keyword recognition module 534. For example, the second keyword recognition module 544 may be capable of recognizing many different types of keywords, more than the first keyword recognition module 534 is capable of recognizing.

According to an embodiment, the second processor 540 may operate in a wake-up mode in response to reception of a keyword verification request from the first processor 530. Operating in the wake-up mode may include transition of the second keyword recognition module 544 into a wake-up state. However, this is merely an example, and the embodiment of the disclosure is not limited thereto. For example, in response to reception of the keyword verification request, the second processor 540 may change at least two modules among the second pre-processing module 542, the second keyword recognition module 544, and the voice processing module 546 into the wake-up state.

According to an embodiment, in response to operating in the wake-up mode, the second processor 540 may perform a verification operation on an utterance received via the first group microphones 512. The utterance received via the first group microphones 512 may be provided from the first processor 530, and the second processor 540 may perform a verification operation that extracts a predetermined keyword from the utterance received via the first group microphones 512, using the second keyword recognition module 544.

According to an embodiment, when the keyword verification operation on the utterance received via the first group microphones 512 is completed, the second processor 540 may provide a verification result to the first processor 530. For example, if a predetermined keyword is extracted from the utterance received via the first group microphones 512, the second processor 540 may transmit information indicating the same to the first processor 530. In this instance, the second processor 540 may provide the verification result and may maintain the wake-up mode. For example, the second processor 540 may maintain the wake-up mode, and may process an utterance received via the second group microphones 514. The utterance received via the second group microphones 514 may be natural language processed via the second pre-processing module 542, the second keyword recognition module 544, and the voice processing module 546. As another example, if a keyword is not extracted from the utterance received via the first group microphones 512, the second processor 540 may transmit information indicating the same to the first processor 530. In this instance, the second processor 540 may provide the verification result and may operate in a sleep mode.

According to an embodiment, if the second processor 540 receives a subsequent utterance from the first processor 530 after providing the verification result, the second processor 540 may process the received subsequent utterance. For example, the second processor 540 may perform natural language processing on utterance data corresponding to the received subsequent utterance via the voice processing module 546.

In the embodiment, it is illustrated that natural language processing on a received utterance is performed by the voice processing module 546 included in the electronic device. However, this is merely an example, and the embodiment of the disclosure is not limited thereto. For example, natural language processing on a received utterance may be performed by a server that analyzes utterance data.

An electronic device (e.g., the electronic device 401 of FIG. 4) according to various embodiments may include: one or more microphone arrays (e.g., mic array 501 of FIG. 5A) including a plurality of microphones; at least one processor (e.g., the processor 420 of FIG. 4) operatively connected to the microphone arrays; and at least one memory (e.g., the memory 430 of FIG. 4) electrically connected to the at least one processor. According to an embodiment, the memory may store instructions which, when executed, enable the at least one processor to: receive a wake-up utterance, which calls a designated voice service, using first group microphones among the plurality of microphones, while operating in a first state; operate in a second state in response to the wake-up utterance; and receive a subsequent utterance using second group microphones among the plurality of microphones, while operating in the second state. According to an embodiment, the first state may include a sleep mode, and the second state may include a wake-up mode. According to an embodiment, the designated voice service may include a voice-based intelligent assistant service.

According to various embodiments, the at least one processor may include a first processor (e.g., the first processor 530 of FIG. 5A) and a second processor (e.g., the second processor 540 of FIG. 5A), which is capable of operating logically or physically separately from the first processor, and the instructions may include an instruction which enables the first processor to perform an operation associated with the first state, and enables the second processor to perform an operation associated with the second state.

According to various embodiments, the first group microphones may include microphones included in the mic array, and the second group microphones may include microphones, the number of which is greater than the first group microphones.

According to various embodiments, the at least one processor may include a first processor and a second processor, which is capable of operating logically or physically separately from the first processor, and the instructions may include an instruction which enables the first processor to perform an operation associated with the first state if detecting a state change event while operating in the second state.

According to various embodiments, the at least one processor may include a first processor and a second processor, which is capable of operating logically or physically separately from the first processor, and the instructions may include an instruction which enables the first processor to request the second processor to verify the wake-up utterance in response to the wake-up utterance, and if the verification of the wake-up utterance is completed by the second processor, enables the second processor to operate an operation associated with the second state. According to an embodiment, the instructions may include an instruction which enables the first processor to receive another subsequent utterance using the first group microphones until the verification of the wake-up utterance is completed by the second processor, and if the verification of the wake-up utterance is completed by the second processor, enables the first processor to provide the received another subsequent utterance to the second processor. According to an embodiment, the instructions may include an instruction which enables the second processor to perform natural language processing on the received another subsequent utterance.

According to various embodiments, the at least one processor may include a first processor and a second processor, which is capable of operating logically or physically separately from the first processor, and the instructions may include an instruction which enables the first processor to perform first pre-processing on the wake-up utterance that calls the designated voice service, and enables the second processor to perform second pre-processing on the subsequent utterance, the second pre-processing having a greater processing capability than that of the first pre-processing.

According to various embodiments, the electronic device may include a switch operatively connected to the microphone arrays and the at least one processor, and the at least one processor may include a first processor and a second processor, which is capable of operating logically or physically separately from the first processor, and the instructions may include an instruction which enables the switch to provide an utterance received via the first group microphones to the first processor, while operating in the first state, and enables the switch to provide an utterance received via the second group microphones to the second processor, while operating in the second state. According to an embodiment, the switch may be implemented as a multiplexer.

According to various embodiments, the at least one processor may include a first processor and a second processor which operates logically or physically separately from the first processor, and the instructions may include an instruction that changes the second processor to a deactivated state while operating in the first state, and changes the first processor to a deactivated state while operating in the second state.

Figure 7:
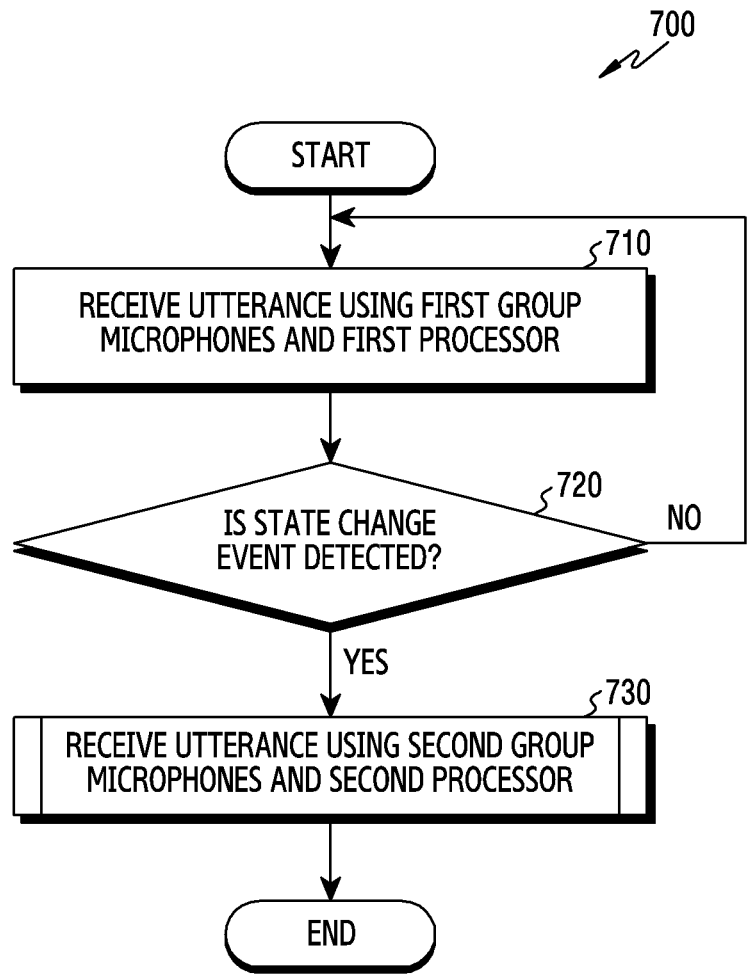
FIG. 7 is a flowchart illustrating a process of providing an intelligent assistance service in an electronic device according to various embodiments.

FIG. 7 is a flowchart 700 illustrating a process of providing an intelligent assistance service in an electronic device according to various embodiments. In the embodiment provided hereinafter, operations may be performed sequentially, but it is not necessarily limited thereto. For example, the order of operations may be changed, and at least two operations may be performed in parallel. The electronic device of FIG. 7 may be the electronic device 401 of FIG. 4.

Referring to FIG. 7, an electronic device (e.g., the first processor 530 of FIG. 5A) according to various embodiments may receive an utterance using the first group microphones 512 in operation 710. The first group microphones 512 may be some of microphones included in the mic array 510. For example, an utterance may be received via the first group microphones 512 while the electronic device operates in a first state (e.g., a sleep mode). An utterance may include a wake-up utterance that directs activation or calling of an intelligent assistance service, and/or a control utterance that directs operation (e.g., power control or volume control) of a hardware/software configuration included in a control device.

According to various embodiments, the electronic device (e.g., the first processor 530 of FIG. 5A) may determine whether a state change event is detected in operation 720. The state change may include a change of the operation state of the electronic device from the first state (e.g., a sleep mode) to a second state (e.g., a wake-up mode). For example, the first processor 530 may determine that a state change event is detected in response to extracting a predetermined keyword from the utterance. However, this is merely an example, and the embodiment of the disclosure is not limited thereto. For example, even when a battery power supply mode is changed to an adaptor-based power supply mode, the first processor 530 may determine that a state change event is detected.

If a state change event is not detected, the electronic device (e.g., the first processor 530 of FIG. 5A) may receive an utterance using the first group microphones 512. For example, the first processor 530 may perform an operation related to at least one of operation 710 and operation 720.

If a state change event is detected, the electronic device (e.g., the second processor 540 of FIG. 5A) may receive a subsequent utterance using the second group microphones 514 in operation 730. The second group microphones 514 may include a larger number of microphones than first group microphones 512. For example, the second group microphones 514 may be all the microphones included in the mic array 510. For example, the subsequent utterance may be received via the second group microphones 514 while the electronic device operates in the second state (e.g., a wake-up mode).

Figure 8:
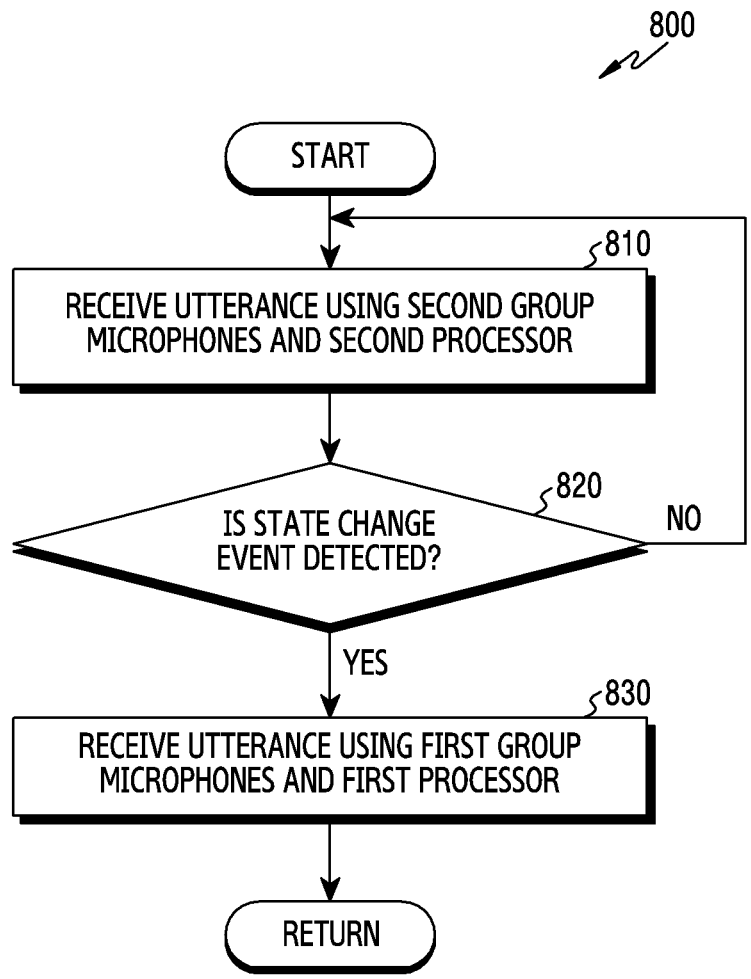
FIG. 8 is a flowchart illustrating a process of changing an operation state in an electronic device according to various embodiments.

FIG. 8 is a flowchart 800 illustrating a process of changing an operation state in an electronic device according to various embodiments. The operations of FIG. 8 described hereinafter are various embodiments of operation 730 of FIG. 7. In the embodiment provided hereinafter, operations may be performed sequentially, but it is not necessarily limited thereto. For example, the order of operations may be changed, and at least two operations may be performed in parallel. The electronic device of FIG. 8 may be the electronic device 401 of FIG. 4.

Referring to FIG. 8, an electronic device (e.g., the second processor 540 of FIG. 5A) according to various embodiments may receive an utterance using the second group microphones 514 in operation 810. For example, the second processor 540 may receive an utterance while the electronic device operates in the second state (e.g., a wake-up mode). An utterance may include a wake-up utterance that directs activation or calling of an intelligent assistance service, and/or a control utterance that directs operation (e.g., power control or volume control) of a hardware/software configuration included in a control device.

According to various embodiments, the electronic device (e.g., the second processor 540 of FIG. 5A) may determine whether a state change event is detected while operating in the second state in operation 820. The state change may include a change of the operation state of the electronic device from the second state (e.g., a wake-up mode) to the first state (e.g., a sleep mode). For example, if an utterance is not received via the second group microphones 514 during a predetermined period of time, the second processor 540 may determine that a state change event is detected. However, this is merely an example, and the embodiment of the disclosure is not limited thereto. For example, the second processor 540 may determine that a state change event is detected in response to extracting, from the utterance, a command (e.g., a sleep keyword) that directs entering the first state (e.g., the sleep mode). In addition, even when an adaptor-based power supply mode is changed to a battery power supply mode, the second processor 540 may determine that a state change event is detected.

If a state change event is not detected, the electronic device (e.g., the second processor 540 of FIG. 5A) may maintain the second state that receives an utterance using the second group microphones 514. For example, the second processor 540 may perform an operation related to at least one of operation 810 and operation 820.

If a state change event is detected, the electronic device (e.g., the first processor 530 of FIG. 5A) may change to the first state that receives an utterance using the first group microphones 512 in operation 830. For example, the first processor 530 may receive an utterance while the electronic device operates in the first state (e.g., a wake-up mode). While receiving the utterance using the first group microphones 512, the second processor 540 may change to a deactivated state (e.g., a sleep mode).

Figure 9:
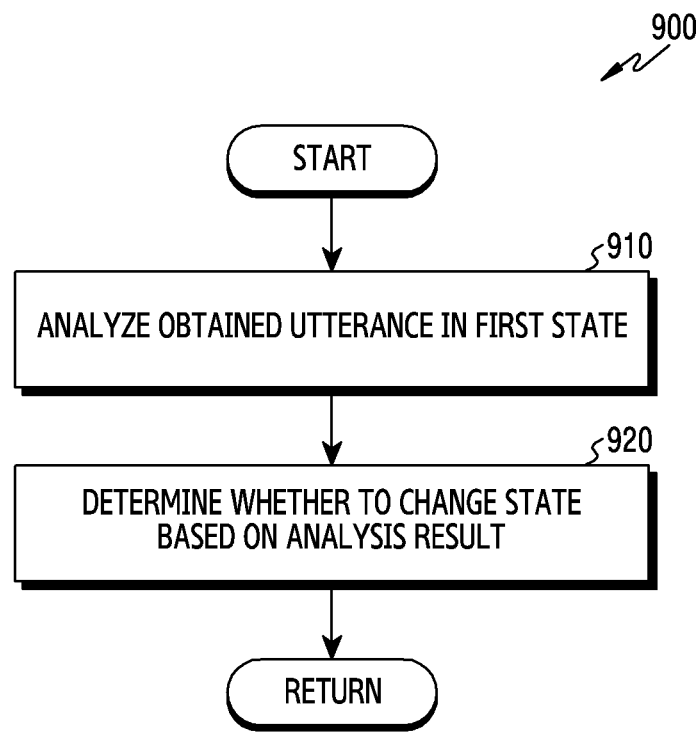
FIG. 9 is a flowchart illustrating a process of determining whether to change a state in an electronic device according to various embodiments.

FIG. 9 is a flowchart 900 illustrating a process of determining whether to change a state in an electronic device according to various embodiments. The operations of FIG. 9 described hereinafter are various embodiments of operation 730 of FIG. 7. In the embodiment provided hereinafter, operations may be performed sequentially, but it is not necessarily limited thereto. For example, the order of operations may be changed, and at least two operations may be performed in parallel. The electronic device of FIG. 9 may be the electronic device 401 of FIG. 4.

Referring to FIG. 9, an electronic device (e.g., the second processor 540 of FIG. 5A) according to various embodiments may analyze an utterance obtained while the electronic device operates in a first state (e.g., a sleep mode) in operation 910. The utterance to be analyzed may be an utterance obtained via the first group microphones 512. Utterance analysis may be verification for a keyword recognition operation performed by the first processor 530. For example, the second processor 540 may perform a verification operation using a keyword recognition module (e.g., the second keyword recognition module 544) having a greater recognition capability than that of a keyword recognition module (e.g., the first keyword recognition module 534) of the first processor 530.

According to various embodiments, the electronic device (e.g., the second processor 540 of FIG. 5A) may determine whether to change a state based on an analysis result in operation 920. For example, if it is determined that keyword recognition is normally performed, based on the utterance analysis, the second processor 540 may operate in a second state (e.g., a wake-up mode). In this instance, the second processor 540 may perform processing so as to change the first processor 530 to a deactivated state (e.g., a sleep mode). As another example, if it is determined that the keyword recognition is abnormally performed, based on the utterance analysis, the second processor 540 may operate in the first state (e.g., a sleep mode). In this instance, the second processor 540 may perform processing so as to maintain the first processor 530 in an activated mode (e.g., a wake-up mode).

Figure 10:
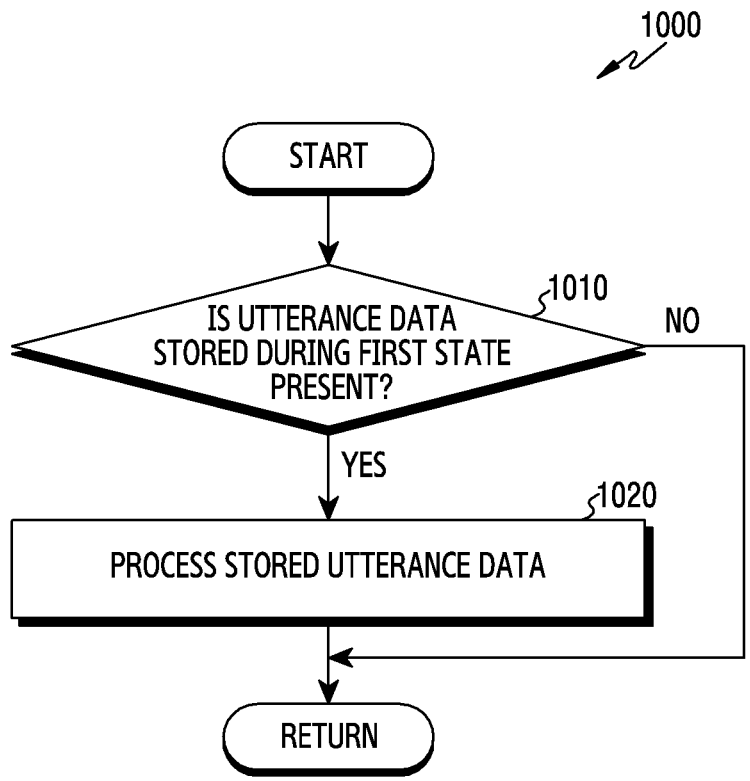
FIG. 10 is a flowchart illustrating a process of processing a subsequent utterance in an electronic device according to various embodiments.

FIG. 10 is a flowchart 1000 illustrating a process of processing a subsequent utterance in an electronic device according to various embodiments. The operations of FIG. 10 described hereinafter are various embodiments of operation 730 of FIG. 7. In the embodiment hereinafter, operations may be performed sequentially, but it is not necessarily limited thereto. For example, the order of operations may be changed, and at least two operations may be performed in parallel. The electronic device of FIG. 10 may be the electronic device 401 of FIG. 4.

Referring to FIG. 10, an electronic device (e.g., the second processor 540 of FIG. 5A) according to various embodiments may determine whether an utterance is present, which is stored while the electronic device operates in a first state (e.g., a sleep mode) in operation 1010. The stored utterance may include a subsequent utterance obtained via the first group microphones 512 while a verification operation is performed via the second processor 540.

If a subsequent utterance is not present, which is obtained via the first group microphones 512 while the verification operation is performed by the second processor 540, the second processor 540 may receive an utterance via the second group microphone 514. The utterance received via the second group microphones 514 may be natural language processed by the electronic device or a server that analyzes utterance data.

If a subsequent utterance is present, which is obtained via the first group microphones 512 while the verification operation is performed by the second processor 540, the second processor 540 may perform natural language processing on the stored subsequent utterance in operation 1020. Accordingly, processing the subsequent utterance, which was obtained before the second processor 540 enters a wake-up mode, may be prevented from being omitted or delayed. In addition, the second processor 540 may perform natural language processing on the subsequent utterance, and may receive an utterance via the second group microphones 514. However, this is merely an example, and the embodiment of the disclosure is not limited thereto. For example, the second processor 540 may receive an utterance via the second group microphones 514 while performing natural language processing on the subsequent utterance.

Figure 11:
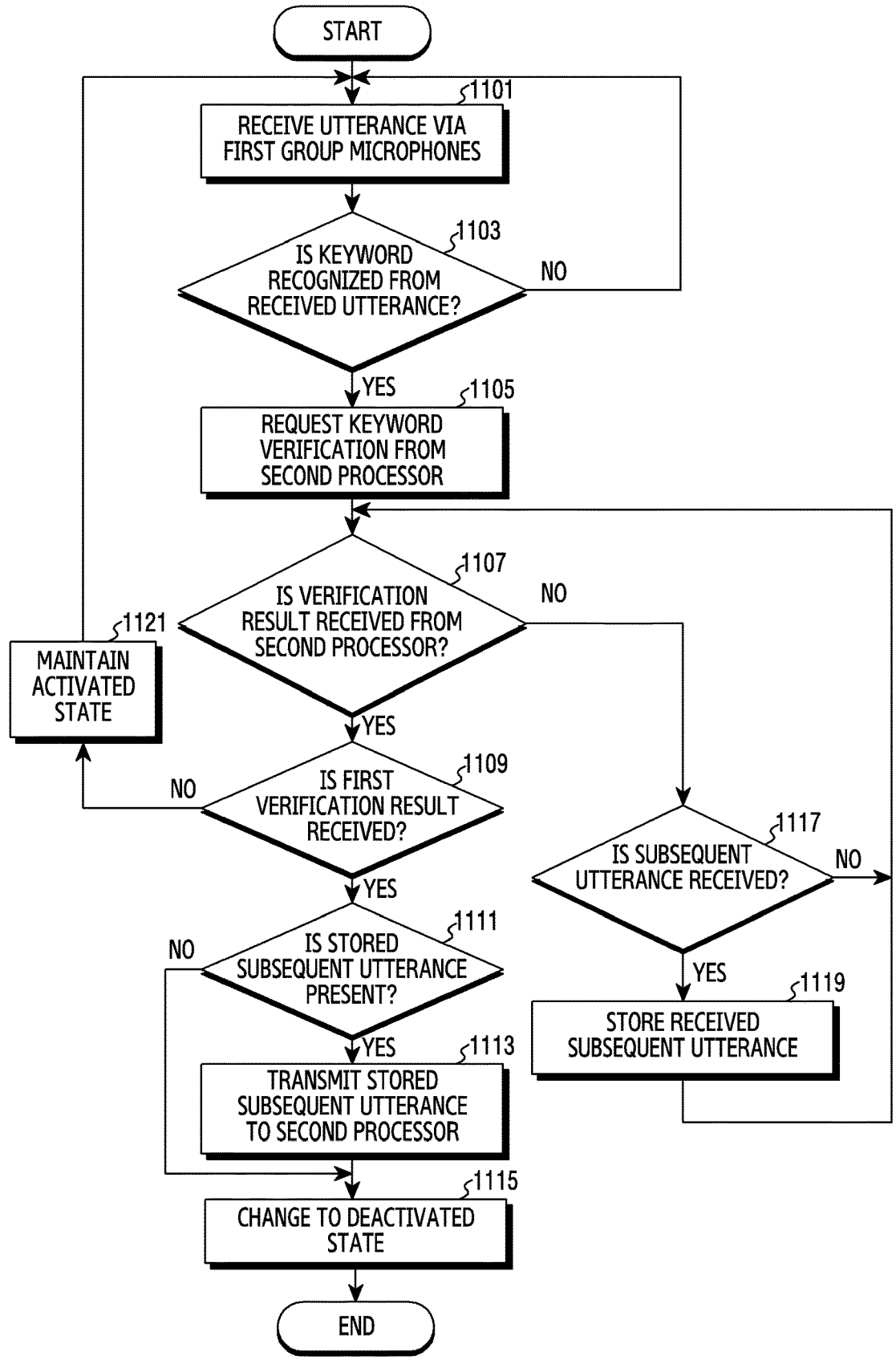
FIG. 11 is a flowchart illustrating a process of processing an utterance in a first processor according to various embodiments.

FIG. 11 is a flowchart 1100 illustrating a process of processing an utterance in a first processor according to various embodiments. In the embodiment hereinafter, respective operations may be performed sequentially, it is not necessarily limited thereto. For example, the order of operations may be changed, and at least two operations may be performed in parallel. The first processor of FIG. 11 may be the first processor 530 of FIG. 5A.

Referring to FIG. 11, the first processor 530 according to various embodiments may receive an utterance using the first group microphones 512 while an electronic device (e.g., the electronic device 401 of FIG. 4) operates in a first state (e.g., a sleep mode) in operation 1101. The first group microphones 512 may be some of the microphones included in the mic array 510.

According to various embodiments, the first processor 530 may recognize a predetermined keyword from the received utterance in operation 1103. The predetermined keyword may include a wake-up keyword that directs activation or calling of an intelligent assistance service. According to an embodiment, the first processor 530 may be capable of performing pre-processing on the received utterance, in order to perform keyword recognition.

If a predetermined keyword is not recognized from the received utterance, the first processor 530 may perform an operation of receiving an utterance and recognizing a keyword. For example, the first processor 530 may perform an operation related to operation 1101 and operation 1103.

If a predetermined keyword is recognized from the received utterance, the first processor 530 may request the second processor 540 to verify the extracted keyword in operation 1105. The keyword verification request may include a command that directs wake-up of the second processor 540. For example, the first processor 530 may request keyword verification by providing the utterance received via the first group microphones 512 to the second processor 540.

According to various embodiments, the first processor 530 may determine whether a keyword verification result is received from the second processor 540 in operation 1107.

If the verification result is not received from the second processor 540, the first processor 530 may determine whether a subsequent utterance is received via the first group microphones 512 in operation 1117. The subsequent utterance may include a control utterance that directs operation (e.g., power control or volume control) of a hardware/software configuration included in at least one control device. According to an embodiment, if the subsequent utterance is not received, the first processor 530 may identify whether the verification result is received. According to another embodiment, if the subsequent utterance is received, the first processor 530 may store the utterance received via the first group microphones 512 in operation 1119. The subsequent utterance may be stored until the verification result is received.

If the verification result is received from the second processor 540, the first processor 530 may identify the verification result in operation 1109. The verification result may include a first result indicating that a normal keyword is recognized from the utterance received via the first group microphones 512, and a second result indicating that an abnormal keyword is recognized from the utterance received via the first group microphones 512.

If the verification result received from the second processor 540 is the second result, the first processor 530 may maintain an activated state (e.g., a wake-up mode) in operation 1121. For example, the first processor 530 may perform an operation of recognizing a predetermined keyword from an utterance received via the first group microphones 512.

If the verification result received from the second processor 540 is the first result, the first processor 530 may determine whether a stored subsequent utterance is present in operation 1111.

If the stored subsequent utterance is present, the first processor 530 may transmit the stored subsequent utterance to the second processor 540 in operation 1113. According to an embodiment, the first processor 530 transmits the subsequent utterance to the second processor 540, and may change to a deactivated state (e.g., a sleep mode) in operation 1115.

If the stored subsequent utterance is not present, the first processor 530 may change to a deactivated state (e.g., a sleep mode) in operation 1115.

Figure 12:
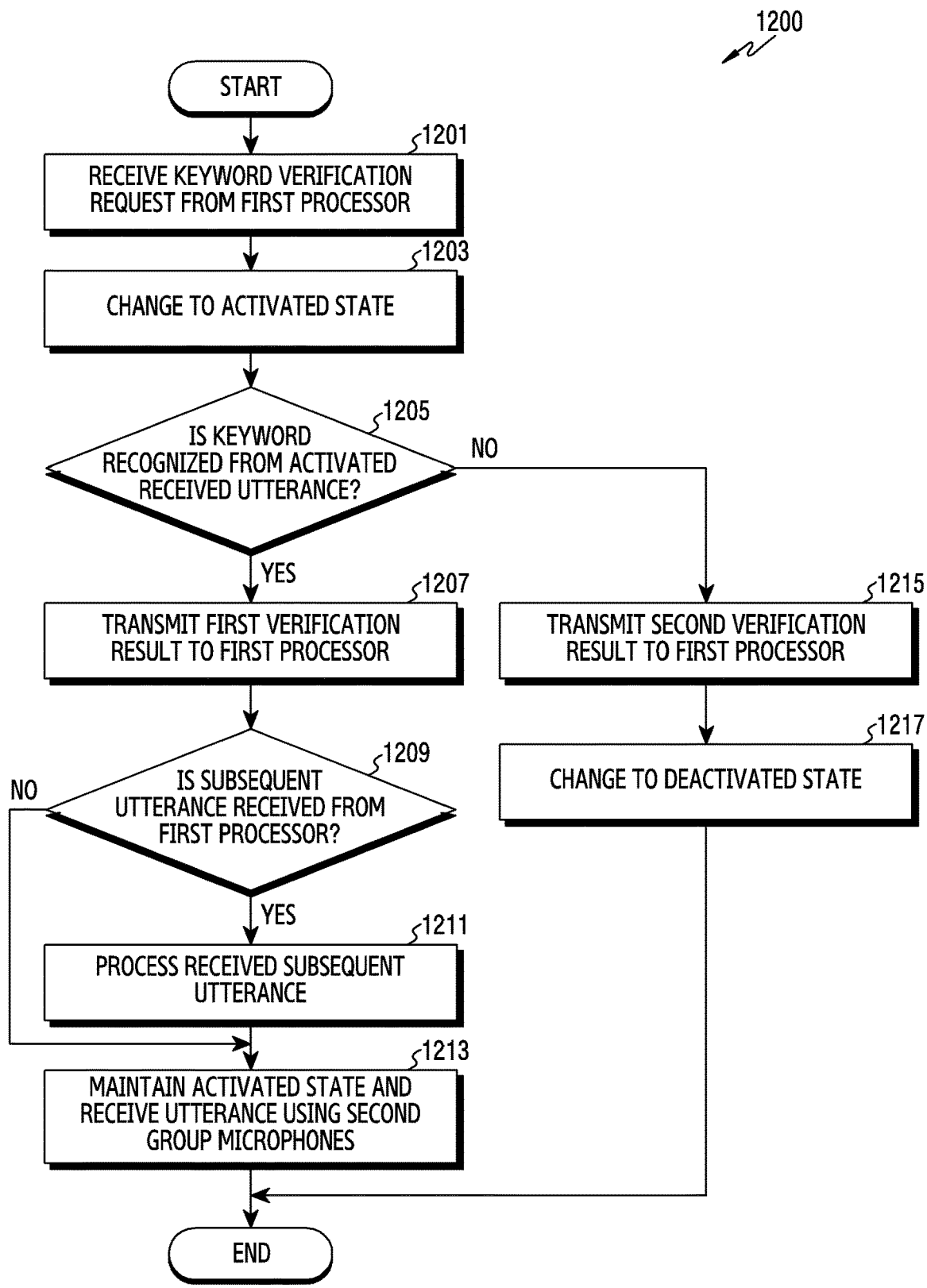
FIG. 12 is a flowchart illustrating a process of processing an utterance in a second processor according to various embodiments.

FIG. 12 is a flowchart 1200 illustrating a process of processing an utterance in a second processor according to various embodiments. In the embodiments hereinafter, operations may be performed sequentially, but it is not necessarily limited thereto. For example, the order of operations may be changed, and at least two operations may be performed in parallel. The second processor of FIG. 12 may be the second processor 540 of FIG. 5A.

Referring to FIG. 12, the second processor 540 according to various embodiments may receive a keyword verification request from the first processor 530 in operation 1201. Keyword verification may be verification of a keyword recognition operation performed by the first processor 530. According to an embodiment, an utterance which needs to be verified may be an utterance received via the first group microphones 512, and the second processor 540 may receive an utterance, which needs to be verified, from the first processor 530.

According to various embodiments, the second processor 540 may change to an activated state (e.g., a wake-up mode) in operation 1203. For example, the second processor 540 may change the second keyword recognition module 544 to a wake-up mode in order to recognize a keyword.

According to various embodiments, the second processor 540 may perform a keyword verification operation and may identify a verification result in operation 1205. For example, the second processor 540 may perform a verification operation on an utterance provided from the first processor 520. The verification operation may be performed via the second keyword recognition module 544 that is changed to a wake-up mode. As described above, the second keyword recognition module 544 may have a recognition capability greater than that of the first processor 530 (e.g., the first keyword recognition module 534).

If it is determined that an abnormal keyword is recognized from the utterance received via the first group microphones 512, the second processor 540 may transmit a second verification result indicating that an abnormal keyword is recognized to the first processor 530 in operation 1215. According to an embodiment, the second processor 540 transmits the second verification result, and may change to a deactivated state (e.g., a sleep mode) in operation 1217.

If it is determined that a normal keyword is recognized from the utterance received via the first group microphones 512, the second processor 540 may transmit a first verification result indicating that a normal keyword is recognized to the first processor 530 in operation 1207.

After transmitting the first verification result, the second processor 540 may determine whether a subsequent utterance is received from the first processor 530 in operation 1209. The subsequent utterance may include an utterance obtained via the first group microphones 512 while a verification operation is performed via the second processor 540.

If a subsequent utterance is received from the first processor 530, the second processor 540 may process the received subsequent utterance in operation 1211. For example, the second processor 540 may perform natural language processing on the received subsequent utterance. According to an embodiment, after processing the subsequent utterance, the second processor 540 may maintain an activated state (e.g., a wake-up mode) in operation 1213. For example, the second processor 540 may process an utterance using the second group microphones 514.

If a subsequent utterance is not received from the first processor 530, the second processor 540 may perform an operation related to operation 1213.

An operation method of an electronic device (e.g., the electronic device 401 of FIG. 4) according to various embodiments may include an operation of receiving a wake-up utterance, which calls a designated voice service, using first group microphones among a plurality of microphones (e.g., the mic array 501 of FIG. 5A), while operating in a first state, and changing a state of the electronic device to a second state in response to the wake-up utterance. According to an embodiment, while operating in the second state, the method may include an operation of receiving a subsequent utterance using second group microphones among the plurality of microphones. According to an embodiment, the first state may include a sleep mode, and the second state may include a wake-up mode. According to an embodiment, the designated voice service may include a voice-based intelligent assistant service.

According to various embodiments, the operation method of the electronic device may include an operation of activating a first processor (e.g., the first processor 530 of FIG. 5A) to receive the wake-up utterance, and an operation of activating a second processor (e.g., the second processor 540 of FIG. 5A), which has an utterance recognition capability relatively greater than that of the first processor, in order to receive the subsequent utterance.

According to various embodiments, the first group microphones may include microphones included in the mic array, and the second group microphones may include microphones, the number of which is greater than the first group microphones.

According to various embodiments, the operation method of the electronic device may include an operation of activating the first processor to operate an operation associated with the first state if detecting a state change event while operating in the second state.

According to various embodiments, the operation method of the electronic device may include an operation of activating the second processor to verify the wake-up utterance in response to the wake-up utterance, and an operation of performing an operation associated with the second state if the verification of the wake-up utterance is completed. According to an embodiment, the method may include an operation of maintaining the first processor in an activated state so as to receive another subsequent utterance using first group microphones, until the verification of the wake-up utterance is completed. According to an embodiment, the method may include an operation of controlling the second processor so as to perform natural language processing on the received another subsequent utterance if the verification of the wake-up utterance is completed.

According to various embodiments, the operation method of the electronic device may include an operation of controlling the first processor so as to perform first pre-processing on the wake-up utterance which calls the designated voice service, and an operation of controlling the second processor so as to perform second pre-processing on the subsequent utterance, the second pre-processing having a greater processing capability than that of the first pre-processing.

According to various embodiments, the operation method of the electronic device may include an operation of activating the first processor and deactivating the second processor while operating in the first state, and an operation of activating the second processor and deactivating the first processor while operating in the second mode.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. An electronic device comprising:
one or more microphone arrays including a plurality of microphones;
at least one processor operatively connected to the one or more microphone arrays; and
at least one memory electrically connected to the at least one processor,
wherein the at least one processor comprises a first processor and a second processor which is capable of operating logically or physically separately from the first processor,
wherein the memory stores instructions which, when executed, enable the first processor to:
receive a wake-up utterance, which calls a designated voice service, using first group microphones among the plurality of microphones, while operating in a first state,
request a verification of the received wake-up utterance to the second processor, wherein the second processor operates in a second state in response to receiving the request of the verification of the wake-up utterance,
receive a first subsequent utterance using the first group microphones among the plurality of microphones while the verification of the wake-up utterance is performed by the second processor, and in case that the second processor completes the verification of the wake-up utterance, provide the first subsequent utterance to the second processor,
wherein the second processor is configured to receive a second subsequent utterance using second group microphones among the plurality of microphones, while operating in the second state, and
wherein the second group microphones comprise microphones, a number of which is greater than a number of the first group microphones.

2. The electronic device as claimed in claim 1, wherein the instructions comprise an instruction which enables the first processor to perform an operation associated with the first state, and enables the second processor to perform an operation associated with the second state.

3. The electronic device as claimed in claim 1, wherein the instructions comprise an instruction which enables the first processor to perform an operation associated with the first state if detecting a state change event while operating in the second state.

4. The electronic device as claimed in claim 1, if the verification of the wake-up utterance is completed by the second processor, enables the second processor to operate an operation associated with the second state.

5. The electronic device as claimed in claim 4, wherein the instructions comprise an instruction which enables the second processor to perform natural language processing on the received first subsequent utterance.

6. The electronic device as claimed in claim 1, wherein the instructions comprise an instruction which enables the first processor to perform a first pre-processing on the wake-up utterance that calls the designated voice service, and enables the second processor to perform a second pre-processing on the first subsequent utterance or the second subsequent utterance, the second pre-processing having a greater processing capability than that of the first pre-processing.

7. The electronic device as claimed in claim 1, wherein the electronic device comprises a switch operatively connected to the microphone arrays and the at least one processor,
wherein the instructions comprise an instruction which enables the switch to provide an utterance received via the first group microphones to the first processor, while operating in the first state, and enables the switch to provide an utterance received via the second group microphones to the second processor, while operating in the second state.

8. An operation method of an electronic device, the method comprising:
while a first processor operates in a first state, receiving, by the first processor, a wake-up utterance, which calls a designated voice service, using first group microphones among a plurality of microphones,
requesting, by the first processor, a verification to the received wake-up utterance to a second processor, wherein the second processor operates in a second state in response to the request of the verification of the wake-up utterance,
receiving, by the first processor, a first subsequent utterance using the first group microphones among the plurality of microphones while the verification of the wake-up utterance is performed by the second processor; and in case that the second processor completes the verification of the wake-up utterance, providing, by the first processor, the first subsequent utterance to the second processor;

wherein while the second processor operates in the second state, the second processor is configured to receive a second subsequent utterance using second group microphones among the plurality of microphones, and wherein the second group microphones comprise microphones, a number of which is greater than a number of the first group microphones.

9. The method as claimed in claim 8, the method further comprising:

activating the first processor to receive the wake-up utterance; and activating the second processor, which has an utterance recognition capability relatively greater than that of the first processor, in order to receive the first subsequent utterance or the second subsequent utterance.

10. The method as claimed in claim 9, the method further comprising:

if detecting a state change event while the second processor operates in the second state, activating the first processor to operate an operation associated with the first state.

11. The method as claimed in claim 9, the method further comprising:

activating the second processor to verify the wake-up utterance in response to the wake-up utterance; and if the verification of the wake-up utterance is completed, performing an operation associated with the second state.

12. The method as claimed in claim 11, the method further comprising:

until the verification of the wake-up utterance is completed, maintaining the first processor in an activated state so as to receive the first subsequent utterance using the first group microphones.

13. The method as claimed in claim 12, the method further comprising:

controlling the second processor so as to perform natural language processing on the received first subsequent utterance, if the verification of the wake-up utterance is completed.

14. The method as claimed in claim 8, the method further comprising:

controlling the first processor so as to perform first pre-processing on the wake-up utterance which calls the designated voice service; and controlling the second processor so as to perform second pre-processing on the first subsequent utterance or the second subsequent utterance, the second pre-processing having a greater processing capability than that of the first pre-processing.

* * * * *